United States Patent [19]

Ketcham

[11] Patent Number: 4,939,107

[45] Date of Patent: Jul. 3, 1990

[54] TRANSFORMATION TOUGHENED CERAMIC ALLOYS

[75] Inventor: Thomas D. Ketcham, Big Flats, N.Y.

[73] Assignee: Corning Incorporated, Corning, N.Y.

[21] Appl. No.: 245,523

[22] Filed: Sep. 19, 1988

[51] Int. Cl.$^5$ ............................................. C04B 35/48
[52] U.S. Cl. ................................... 501/103; 501/102; 501/104; 423/608
[58] Field of Search ................. 501/103, 102, 104, 49; 423/608

[56] References Cited

U.S. PATENT DOCUMENTS

| | | | |
|---|---|---|---|
| H,302 | 7/1987 | Nevitt et al. | 501/103 |
| 4,770,673 | 9/1988 | Ketcham et al. | 501/103 |

Primary Examiner—William R. Dixon, Jr.
Assistant Examiner—Melissa Bonner
Attorney, Agent, or Firm—Clinton S. Janes, Jr.

[57] ABSTRACT

This invention is primarily directed to the production of transformation toughened $ZrO_2$-containing ceramic alloys wherein the toughening agent is selected from the group consisting of a rare earth metal vanadate and a magnesium and/or calcium tungstate/molybdate, and $SnO_2$ can be utilized as a toughening agent and/or a stabilizing agent for $ZrO_2$.

37 Claims, No Drawings

TRANSFORMATION TOUGHENED CERAMIC ALLOYS

BACKGROUND OF THE INVENTION

This invention relates to the transformation toughening of zirconia and other ceramic alloys by utilizing one or more stabilizer additives and a toughening agent. It focuses primarily on the use of novel toughening agents in making a final product with high toughness.

Transformation toughening is associated with the volume change that accompanies the tetragonal-to-monoclinic phase transformation. This transformation can be controlled by incorporating one or more stabilizing oxides into the ceramic matrix material, resulting in retention of the tetragonal phase from high temperature down to room temperature. Transformation toughened, tetragonal, partially stabilized zirconia and ceramic matrix materials toughened by tetragonal, partially stabilized zirconia have proven useful in areas where excellent thermal conductivity, hardness, toughness and strength are required, namely, wear/abrasion resistant ceramics, thermal shock resistant ceramics, cutting tools, draw dies, ceramic bearings, and oxygen ion conductors.

U.S. application Ser. No. 926,655, filed Nov. 4, 1986 under the title TOUGHENED ZIRCONIA ALLOYS, provides an extensive discussion of ceramic alloys containing zirconia and/or hafnia as the primary component, with particular emphasis being given to the mechanism involved in the transformation toughening of zirconia and/or hafnia partially stabilized with yttria through the presence of niobate and tantalate compounds. U.S. Pat. No. 4,753,903 provides further discussion of transformation toughened zirconia alloys wherein titania and yttria are included in the composition.

Thermal barrier coatings of zirconia stabilized or partially stabilized with yttria are currently utilized in gas turbine and other high temperature heat engines. These coatings are degraded relatively rapidly through the loss of the yttria stabilizer due to the formation of yttrium vanadate resulting from the presence of vanadium compound impurities in the fuels being used. The development of zirconia alloys containing a vanadium compound incorporated therein would yield bodies exhibiting much increased resistance to that source of degradation.

Heretofore, the focus of stabilizer use has been to add a particular oxide dopant to zirconia to obtain specific crystal phase structures and phase distribution, and to arrest the transformation reaction at a defined stage of its operation. As a result, although early researchers worked with such oxides as MgO and CaO for stabilizing $ZrO_2$, more recent research has utilized exotic and costly additives in moderate concentrations such as $Y_2O_3$, $CeO_2$, and other rare earth oxides to produce materials demonstrating many desirable properties. Needless to say, the search for less costly stabilizing agents for $ZrO_2$ has been continuous.

SUMMARY OF THE INVENTION

It is an object of this invention to provide a transformation toughened $ZrO_2$ and/or $HfO_2$ alloy through the incorporation of novel toughening agents therewithin, the $ZrO_2$ and/or $HfO_2$ most preferably being partially stabilized.

A second object of this invention is to provide a $ZrO_2$ and/or $HfO_2$ alloy exhibiting greatly increased resistance to attack by vanadium-containing compounds.

A third object of this invention is to provide a transformation toughened, partially stabilized $ZrO_2$ and/or $HfO_2$ alloy wherein the amount of rare earth oxide stabilizer and, if desired, the concentration of $ZrO_2$ and/or $HfO_2$ can be substantially reduced through the substitution of a material as a stabilizer which is less costly than the rare earth metal oxides, and which material, being compatible with $ZrO_2$, can replace a portion thereof, but without deleteriously affecting the degree of toughening exhibited by the alloy.

Each of those objects can be specifically achieved through the selection of particular materials, as will be described in detail hereinafter. Therefore, to illustrate:

The first object can be attained in:

A ceramic alloy demonstrating high fracture toughness consisting essentially, expressed in terms of mole percent on the oxide basis, of:

(A) 79–99.5% total of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;

(B) 0.25–15% total of at least one stabilizer oxide in the indicated proportion selected from the group consisting of 0–7% $Sc_2O_3$, 0–7% $Y_2O_3$, 0–15% $CeO_2$, 0–15% $TiO_2$, and 0–7% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; and (C) 0.25–6% total of at least one toughening agent in the indicated proportion selected from the group consisting of 0–6% $MgWO_4$, 0–6% $MgMoO_4$, 0–6% $CaWO_4$, 0–6% $CaMoO_4$, 0–4% $WO_3$, and 0–4% $MoO_3$.

U.S. Pat. No. 4,753,002, supra, discloses the efficacy of $TiO_2$ as a stabilizing agent for $ZrO_2$. And, inasmuch as titanium and tin have approximately the same size ionic radii in the +4 valence state, they both can form oxides with crystals having a rutile-type structure, and the solid solution between $TiO_2$ and $SnO_2$ is complete at high temperatures. $SnO_2$ likewise can perform as a stabilizer in $ZrO_2$-containing alloys. A simple mixture of $ZrO_2$ and $SnO_2$, however, does not provide the toughness desired in the product; a relatively small amount of $Sc_2O_3$, $Y_2O_3$, and/or a rare earth metal oxide is demanded to insure significant toughening. Nevertheless, the inclusion of $SnO_2$ substantially reduces the required amount of $ZrO_2$ and stabilizer. In summary, because of the above-described similarities in structure and behavior, $SnO_2$ can replace $TiO_2$ in the alloys. In general, such substitution will not exceed about one-half of the $TiO_2$ content.

The resulting alloy consists of fine-grained crystals of mixed phases typically having diameters of less than about five microns consisting essentially either of tetragonal and monoclinic structures, or of a phase consisting essentially of tetragonal symmetry with a minor amount of a cubic phase and/or a minor amount of a magnesium and/or calcium tungstate and/or molybdate phase.

The second object can be attained in:

A ceramic alloy exhibiting resistance to attack by vanadium-containing compounds consisting essentially, expressed in terms of mole percent on the oxide basis, of:

(A) 65–99.5% total of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution; and (B) 0.5–35% $MVO_4$, wherein M consists of at least one cation selected from the group consisting of $Mg^{+2}$, $Ca^{+2}$, $Sc^{+3}$, $Y^{+3}$, $Ti^{+4}$, and a rare earth metal cation selected from the group consisting of $La^{+3}$, $Ce^{+3}$, $Ce^{+4}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$.

In like manner to the above-described tungstate- and molybdate-toughened alloys, $Sn^{+4}$ can replace at least part of the $Ti^{+4}$ content, normally such replacement will not exceed about one-half of the $Ti^{+4}$ content.

Because vanadium is in the same group of the Periodic Table as niobium and tantalum and has about the same ionic radius as those elements, it can form compounds having crystal structures similar to those formed by niobium and tantalum. For example, yttrium vanadate has a zircon-type crystal structure that can transform to a scheelite-type structure at high pressures. $YNbO_4$, $YTaO_4$, and rare earth metal niobates and tantalates form tetragonal scheelite-type structures at high temperatures that can transform to monoclinic fergusonite-type structures during cooling to room temperature. $CaWO_4$ is the mineral scheelite and $CaMoO_4$ is the mineral powellite, both of which have tetragonal scheelite-type crystal structures at room temperature.

Therefore, because of these structural and chemical similarities, it will be appreciated that, in like manner to the niobate/tantalate toughening agents disclosed in Ser. No. 926,655, supra, yttrium vanadate and its rare earth metal analogs can form extensive solid solutions with $ZrO_2$, and the crystal phases developed and the properties exhibited thereby will be similar to those of the niobate/tantalate analogs.

At high levels of vanadate compounds, i.e., about 10–35%, a non-transformable crystal phase, adjudged to be of tetragonal structure, can form at temperatures of about 1100° C. and higher, in a manner similar to that exhibited by $ZrO_4$-$YNbO_4$ solid solutions. Also present will be crystals exhibiting a cubic habit and crystals of a phase whose chemistry is dominated by the vanadate compound, but which crystals have not been rigorously identified as having a cubic, tetragonal, or monoclinic symmetry.

At lower concentrations, however, the vanadate compounds perform in a similar manner to the above-described magnesium and/or calcium tungstates and/or molybdates to produce transformation toughened $ZrO_2$ alloys. That is, the microstructure of the alloy will consist of fine-grained crystals typically having diameters of less than about five microns of mixed phases consisting essentially either of transformable tetragonal and monoclinic structures, or of a phase consisting essentially of transformable tetragonal symmetry along with a minor amount of a cubic phase. Accordingly, where a toughened body is desired, the content of vanadium compound will be maintained below 10% and, preferably, will not exceed 5%.

Both of the composition intervals, however, will demonstrate much improved resistance to corrosion by vanadium or vanadium compounds at elevated temperatures, because each is closer to chemical equilibrium with vanadium compounds than are $ZrO_2$-$Y_2O_3$ alloys.

The alloy with the greater concentration of vanadate compound will display a higher resistance to such chemical degradation. In addition, the non-transformable solid solution phase will not be as susceptible to spalling as is experienced in $ZrO_2$-$Y_2O_3$ alloys upon loss of some $Y_2O_3$, inasmuch as the production of the monoclinic phase of $ZrO_2$ is much reduced.

Finally, I have found that, where desired, vanadium can be replaced with niobium and/or tantalum. Nevertheless, where resistance to chemical corrosion by vanadium/vanadium compounds at elevated temperatures is sought, and the further factor that vanadium is less expensive than either niobium or tantalum, has limited such substitutions to less than one-half of the vanadium content.

The third object can be attained in:

A ceramic alloy consisting essentially, expressed in terms of mole percent on the oxide basis, of:

(A) 40–94.75% total of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;

(B) 5–45% $SnO_2$; and (C) 0.25–15% total of at least one oxide in the indicated proportion selected from the group consisting of 0–10% $Sc_2O_3$, 0–10% $Y_2O_3$, 0–15% $CeO_2$, and 0–10% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$.

As was explained above, $SnO_2$ can replace $TiO_2$ and vice versa; such replacements generally being limited to no more than one-half of the content. Likewise, it may be desirable to replace up to about one-half of the $SnO_2$ here with $TiO_2$.

The microstructure of the alloys toughened/stabilized with $SnO_2$ will consist of fine-grained crystals of mixed phases commonly having diameters of less than about five microns consisting essentially either of tetragonal and monoclinic structures, or having a crystal phase consisting essentially of tetragonal symmetry with a minor amount of a cubic phase and/or a $ZrSnO_4$ phase.

The inventive ceramic alloys are useful in enhancing the toughness of hard refractory ceramic bodies. That is, as little as 5% by volume of these alloys can impart substantially improved toughness to such bodies. The ceramic matrix, which can comprise up to 95% by volume, may include such materials as $\alpha$-$Al_2O_3$, $\beta$-$Al_2O_3$, $\beta''$-$Al_2O_3$, $Al_2O_3$-$Cr_2O_3$ solid solutions, mullite, nasicon, sialon, SiC, $TiB_2$, $Si_3N_4$, spinel, TiC, $Al_2O_3$-mullite/$Cr_2O_3$-mullite solid solutions, zircon, and ZrC.

At high concentrations of $\alpha$-$Al_2O_3$, $\beta$-$Al_2O_3$, $\beta''$-$Al_2O_3$, and $Al_2O_3$-$Cr_2O_3$ solid solutions, that is, concentrations greater than about 70% by volume, a surprising and, as yet, not understood phenomenon occurs. No additional stabilizing agent as such appears to be necessary in the alloy. Thus, there appears to be no need for the 0.25–15% total of stabilizer oxide in the tungstate- and molybdate-containing alloys or the 0.25–15% total of stabilizer oxide in the $SnO_2$-containing alloys. (It will be appreciated, of course, that the presence of stabilizers in the alloys does not adversely affect the properties of the resultant hard refractory ceramic bodies containing high levels of $Al_2O_3$ and/or $Al_2O_3$-$Cr_2O_3$. Nevertheless, the cost of the stabilizers is typically quite high;

hence, their absence will usually result in a reduction of cost in the final product.)

The inventive ceramic alloys are also effective in producing tough composite bodies wherein refractory ceramic fibers and/or whiskers may comprise up to 80% by volume of the final product. Examples of operable fibers and/or whiskers include $Al_2O_3$, AlN, BN, $B_4C$, mullite, SiC, $Si_3N_4$, silicon oxycarbide, sialon, spinel, zircon, and $ZrO_2$.

Finally, a tough, three-component, composite ceramic body can be produced consisting essentially of the inventive alloy, a hard refractory ceramic, and refractory ceramic fibers and/or whiskers. In such a body the alloy will compose at least 5% by volume, refractory ceramic fibers and/or whiskers are present in an amount not exceeding 80% by volume, and a hard refractory ceramic will comprise the remainder, usually in an amount of at least 5% by volume.

Prior Art

As has been explained above, stabilizer additives have been frequently employed in the ceramic art to restrain otherwise uncontrollable phase transformations. Hence, various dopants have been utilized to arrest the transformation reaction at a point in its development where the resulting phase or mixture of phases renders the material most useful. For example, moderate concentrations of MgO, CaO, $Y_2O_3$, $CeO_2$, and other rare earth oxides have been incorporated into $ZrO_2$ to yield stabilized and partially stabilized bodies demonstrating very interesting properties. $ZrO_2$-$Y_2O_3$ systems are particularly attractive because of the direct dependence of the tetragonal-to-monoclinic transformation temperature on the amount of $Y_2O_3$ present. Such systems, however, did not produce articles exhibiting excellent toughening characteristics, and $Y_2O_3$ is a very expensive ingredient.

U.S. Pat. No. 3,957,500 describes the preparation of stabilized $ZrO_2$ by adding an impure $Y_2O_3$ concentrate containing $Y_2O_3$, heavy and light rare earth metal oxides, and some incidental impurities. Whereas the use of rare earth metal oxides is common to both that invention and the present invention, no reference is made to the utility of $MgWO_4$ and/or $MgMoO_4$ and/or $CaWO_4$ and/or $CaMoO_4$, $WO_3$ and/or $MoO_3$, $MVO_4$, and $SnO_2$ as toughening/stabilizing agents.

U.S. Pat. No. 4,226,979 discloses an oxygen sensor cement prepared by combining $ZrO_2$ powder with 4–8 mole % $Y_2O_3$ powder and then molding and firing the shaped mixture at 1400°–1500° C. Again, there is no reference to the utility of $MgWO_4$ and/or $MgMoO_4$ and/or $CaWO_4$ and/or $CaMoO_4$, $WO_3$ and/or $MoO_3$, $MVO_4$, and $SnO_2$ as toughening/stabilizing agents.

The use of a combination of stabilizers with $ZrO_2$, rather than a single compound, is also known to the art. To illustrate:

U.S. Pat. No. 4,303,447 outlines means for promoting the densification of $ZrO_2$ stabilized with CaO or $Y_2O_3$ at temperatures below 1300° C., desirably below 1150° C., through the addition of $B_2O_3$ or $V_2O_5$ thereto. There is no discussion of the capability of improving the toughness of $ZrO_2$ bodies by incorporating $MgWO_4$ and/or $MgMoO_4$ and/or $CaWO_4$ and/or $CaMoO_4$, $WO_3$ and/or $MoO_3$, $MVO_4$, or $SnO_2$ therein.

U.S. Pat. No. 4,598,053 relates to a $ZrO_2$ body with primary stabilizers selected from the group of oxides consisting of CaO, MgO, $La_2O_3$, $Sc_2O_3$, $Y_2O_3$, and mixtures thereof, and a secondary component consisting of at least one member of the group consisting of carbonitrides, carboxynitrides, oxynitrides, and oxycarbides of Groups IVa, Va, and VIa of the Periodic Table. Again, there is no mention of $MgWO_4$ and/or $MgMoO_4$ and/or $CaWO_4$ and/or $CaMoO_4$, $WO_3$ and/or $MoO_3$, $MVO_4$, and $SnO_2$ as toughening/stabilizing agents.

U.S. Pat. No. 4,659,680 is concerned with a $ZrO_2$ body stabilized with 0.5–10% $Y_2O_3$ and 1–10% of a secondary stabilizer selected from the group consisting of CaO, $CeO_2$, CuO, MgO, and ZnO. Yet again, there is no reference to $MgWO_4$ and/or $MgMoO_4$ and/or $CaWO_4$ and/or $CaMoO_4$, $WO_3$ and/or $MoO_3$, $MVO_4$, and/or $SnO_2$ as toughening/stabilizing agents.

European Pat. No. 140,638 presents a $ZrO_2$-containing sintered body consisting of 50–98 weight % $ZrO_2$ stabilized with 1.5–5 mole % $Y_2O_3$, and 2–50 weight % $Al_2O_3$, mullite, or spinel. Once again, there is no indication of the utility of $MgWO_4$ and/or $MgMoO_4$ and/or $CaWO_4$ and/or $CaMoO_4$, $WO_3$ and/or $MoO_3$, $MVO_4$, and $SnO_2$ as toughening/stabilizing agents.

Two recent disclosures relating to the transformation toughening of $ZrO_2$ bodies have been discussed in some detail above. U.S. Pat. No. 4,753,902 and Ser. No. 926,655 are incorporated by reference into the present disclosure. There is no mention in either disclosure, however, of the use of $MgWO_4$ and/or $MgMoO_4$ and/or $CaWO_4$ and/or $CaMoO_4$, $WO_3$ and/or $MoO_3$, $MVO_4$, and $SnO_2$ as toughening/stabilizing agents.

Description of Preferred Embodiments

The following procedure was used in synthesizing the partially-stabilized, transformation toughened ceramic alloys described in Table I:

Approximately 20 g of commercial zirconia ($ZrO_2$ with 2, 3, 4, and 6 mole % $Y_2O_3$), and appropriate amounts of calcium carbonate and tungsten oxide and/or molybdenum oxide were mixed together by ball-milling in 250 ml nalgene bottles utilizing approximately 45 zirconia balls of 0.5 inch diameter as the milling media. Isopropyl alcohol was added to cover the powder and milling media and the bottles placed into vibromilling canisters and milled for approximately 24 hours. The resulting slurry was poured into Pyrex drying dishes and air dried in a drying oven at 320° F.

After drying, the powders were poured into alumina crucibles, partially covered, and calcined in air at 800° C. for 2 hours. In the case of Example 21, the powder was then combined with nitrate salts of either gadolinium and ytterbium, and the mixture was mixed into enough methanol to make a slurry. The slurry was then dried in a drying oven, calcined at 800° C. for 2 hours, and vibromilled for 24 hours. After milling, the powders were scalped through a nylon screen to break up any agglomerates, reducing the agglomerate size to 50μ or less.

The resulting fine grain powder was pressed into pills, first uniaxially at 1000 psi in a 0.5 inch diameter die and then isostatically at 45 Kpsi for 10 minutes. One pill of each composition was fired at 1300° C., 1400° C., and 1500° C. for 2 hours and examined for completeness of sintering.

The sintered specimens were then ground, polished, and microhardness tested utilizing a 10 kg load. The Young's modulus, denoted by the letter E, was assumed to be 200 GPa unless the measured hardness was lower than 7 GPa. If so, the elastic modulus was multiplied by the measured hardness and divided by 11 GPa, assuming that the modulus decreases in proportion to the hardness. The elastic modulus will decrease with porosity and microcracking which is reflected in a large decrease in hardness.

The toughness, $K_{IC}$, and hardness, H, were calculated from the following equations:

$$K_{IC} = 0.016(E^{0.5}P^{0.5}dC^{-1.5})$$

where E is 200 GPa, P is the 10 kg load, d is the length of the indent diagonal, and C is the crack length from the center of the indent impression, and $$H = 1.845 P/d^2.$$

These equations were utilized in formulating the hardness and toughness data in the following tables.

TABLE I

| Example | Composition (ZrO$_2$ +) | Sintering Temp. (°C.) | Hardness Gpa | Toughness MPa $\sqrt{m}$ |
|---|---|---|---|---|
| 1 | 3 m % Y$_2$O$_3$ | 1300 | 13.7 | 4.8 |
| 1 | 3 m % Y$_2$O$_3$ | 1400 | 13.1 | 5.1 |
| 1 | 3 m % Y$_2$O$_3$ | 1500 | 13.7 | 5.7 |
| 2 | 3 m % Y$_2$O$_3$ + 0.5 m % CaWO$_4$ | 1300 | 9.9 | 6.1 |
| 2 | 3 m % Y$_2$O$_3$ + 0.5 m % CaWO$_4$ | 1400 | 13.1 | 5.0 |
| 2 | 3 m % Y$_2$O$_3$ + 0.5 m % CaWO$_4$ | 1500 | 12.6 | 7.4 |
| 3 | 3 m % Y$_2$O$_3$ + 2.5 m % CaWO$_4$ | 1300 | 9.9 | 6.3 |
| 3 | 3 m % Y$_2$O$_3$ + 2.5 m % CaWO$_4$ | 1400 | 12.0 | 6.7 |
| 3 | 3 m % Y$_2$O$_3$ + 2.5 m % CaWO$_4$ | 1500 | 11.6 | 6.0 |
| 4 | 3 m % Y$_2$O$_3$ + 5.0 m % CaWO$_4$ | 1300 | 10.7 | 6.3 |
| 4 | 3 m % Y$_2$O$_3$ + 5.0 m % CaWO$_4$ | 1400 | 11.6 | 6.5 |
| 4 | 3 m % Y$_2$O$_3$ + 5.0 m % CaWO$_4$ | 1500 | 9.9 | 5.6 |
| 5 | 3 m % Y$_2$O$_3$ + 10 m % CaWO$_4$ | 1300 | 8.0 | 5.9 |
| 5 | 3 m % Y$_2$O$_3$ + 10 m % CaWO$_4$ | 1400 | 11.1 | 5.6 |
| 5 | 3 m % Y$_2$O$_3$ + 10 m % CaWO$_4$ | 1500 | 10.7 | 5.6 |
| 6 | 3 m % Y$_2$O$_3$ + 0.5 m % CaMoO$_4$ | 1300 | Porous | Porous |
| 6 | 3 m % Y$_2$O$_3$ + 0.5 m % CaMoO$_4$ | 1400 | 8.5 | 5.4 |
| 6 | 3 m % Y$_2$O$_3$ + 0.5 m % CaMoO$_4$ | 1500 | 12.0 | 7.3 |
| 7 | 3 m % Y$_2$O$_3$ + 2.5 m % CaMoO$_4$ | 1300 | 6.0 | 5.2 |
| 7 | 3 m % Y$_2$O$_3$ + 2.5 m % CaMoO$_4$ | 1400 | 11.6 | 5.6 |
| 7 | 3 m % Y$_2$O$_3$ + 2.5 m % CaMoO$_4$ | 1500 | 11.6 | 5.5 |
| 8 | 3 m % Y$_2$O$_3$ + 5.0 m % CaMoO$_4$ | 1300 | 5.7 | 5.2 |
| 8 | 3 m % Y$_2$O$_3$ + 5.0 m % CaMoO$_4$ | 1400 | 11.6 | 6.2 |
| 8 | 3 m % Y$_2$O$_3$ + 5.0 m % CaMoO$_4$ | 1500 | 8.6 | 5.5 |
| 9 | 3 m % Y$_2$O$_3$ + 10 m % CaMoO$_4$ | 1300 | Porous | Porous |
| 9 | 3 m % Y$_2$O$_3$ + 10 m % CaMoO$_4$ | 1400 | 9.6 | 6.0 |
| 9 | 3 m % Y$_2$O$_3$ + 10 m % CaMoO$_4$ | 1500 | microcracked | |
| 10 | 3 m % Y$_2$O$_3$ + 1.25 m % CaWO$_4$ + 1.25 m % CaMoO$_4$ | 1300 | porous | porous |
| 10 | 3 m % Y$_2$O$_3$ + 1.25 m % CaWO$_4$ + 1.25 m % CaMoO$_4$ | 1400 | 11.6 | 6.6 |
| 10 | 3 m % Y$_2$O$_3$ + 1.25 m % CaWO$_4$ + 1.25 m % CaMoO$_4$ | 1500 | 12.6 | 8.2 |
| 11 | 2 m % Y$_2$O$_3$ | 1400 | 12.6 | 13.4 |
| 11 | 2 m % Y$_2$O$_3$ | 1500 | 11.6 | 15.1 |
| 12 | 2 m % Y$_2$O$_3$ + 2.5 m % CaWO$_4$ | 1400 | 11.6 | 14.3 |
| 12 | 2 m % Y$_2$O$_3$ + 2.5 m % CaWO$_4$ | 1500 | 11.6 | 15.9 |
| 13 | 2 m % Y$_2$O$_3$ + 5.0 m % CaWO$_4$ | 1400 | 11.6 | 9.4 |
| 13 | 2 m % Y$_2$O$_3$ + | 1500 | 11.6 | 13.6 |

TABLE I-continued

| Example | Composition (ZrO₂ +) | Sintering Temp. (°C.) | Hardness Gpa | Toughness MPa√m |
|---|---|---|---|---|
| | 5.0 m % CaWO₄ | | | |
| 14 | 2 m % Y₂O₃ + 10 m % CaWO₄ | 1400 | 10.7 | 6.1 |
| 14 | 2 m % Y₂O₃ + 10 m % CaWO₄ | 1500 | 9.2 | 14.5 |
| 15 | 4 m % Y₂O₃ | 1300 | 13.7 | 3.6 |
| 15 | 4 m % Y₂O₃ | 1400 | 13.7 | 3.5 |
| 15 | 4 m % Y₂O₃ | 1500 | 12.6 | 4.5 |
| 16 | 4 m % Y₂O₃ + 2.5 m % CaWO₄ | 1300 | 9.9 | 4.6 |
| 16 | 4 m % Y₂O₃ + 2.5 m % CaWO₄ | 1400 | 13.7 | 4.2 |
| 16 | 4 m % Y₂O₃ + 2.5 m % CaWO₄ | 1500 | 12.6 | 5.1 |
| 17 | 4 m % Y₂O₃ + 3.0 m % WO₃ | 1300 | 11.6 | 4.0 |
| 17 | 4 m % Y₂O₃ + 3.0 m % WO₃ | 1400 | 11.6 | 4.9 |
| 17 | 4 m % Y₂O₃ + 3.0 m % WO₃ | 1500 | 9.9 | 6.5 |
| 18 | 4 m % Y₂O₃ + 3.0 m % MoO₃ | 1300 | porous | porous |
| 18 | 4 m % Y₂O₃ + 3.0 m % MoO₃ | 1400 | 6.6 | 4.5 |
| 18 | 4 m % Y₂O₃ + 3.0 m % MoO₃ | 1500 | 11.6 | 7.0 |
| 19 | 6 m % Y₂O₃ | 1300 | 13.7 | 2.5 |
| 19 | 6 m % Y₂O₃ | 1400 | 13.7 | 2.6 |
| 19 | 6 m % Y₂O₃ | 1500 | 13.1 | 2.9 |
| 20 | 6 m % Y₂O₃ + 2.5 m % CaWO₄ | 1300 | 8.0 | 2.5 |
| 20 | 6 m % Y₂O₃ + 2.5 m % CaWO₄ | 1400 | 12.6 | 2.7 |
| 20 | 6 m % Y₂O₃ + 2.5 m % CaWO₄ | 1500 | 11.6 | 3.3 |
| 21 | 3.8 m % (Yb₂O₃,Gd₂O₃) + 2.5 m % WO₃ | 1300 | 11.6 | 3.7 |
| 21 | 3.8 m % (Yb₂O₃,Gd₂O₃) + 2.5 m % WO₃ | 1400 | 11.6 | 3.8 |
| 21 | 3.8 m % (Yb₂O₃,Gd₂O₃) + 2.5 m % WO₃ | 1500 | 9.9 | 10.1 |

The hardness and toughness data shown in Table I indicate that good values of hardness and toughness can be obtained for compositions containing as little as 0.5 mole percent calcium tungstate/molybdate. In yttria-stabilized zirconia, the toughness increased with decreasing yttria content while the hardness decreased gradually with increasing yttria content. Yttria-stabilized zirconia was used as a reference point to which toughness and hardness values were compared as the amount of toughening agent was increased.

At constant yttria mole percent, additions of 0.5-10 mole percent calcium tungstate increased toughness significantly. When stabilized with 3 mole percent yttria and toughened with 0.5-10 mole percent calcium tungstate, toughness values of zirconia ranged from 5.9 to 6.3 MPa√m at 1300° C., from 5.0 to 6.7 MPa√m at 1400° C., and from 5.6 to 7.4 MPa√m at 1500° C. Comparable values of toughness for zirconia stabilized solely with 3 mole percent yttria were 4.8, 5.1, and 5.7 at MPa√m 1300° C., 1400° C., and 1500° C., respectively.

When stabilized with 2 mole percent yttria and toughened with 2.5-10 mole percent calcium tungstate, toughness values of zirconia ranged from 6.1 to 14.3 MPa√m 1400 ° C. and from 13.6 to 15.9 MPa√m at 1500° C. Comparable values of toughness for zirconia stabilized solely with 2 mole percent yttria were 13.4 and 15.1 MPA√m at 1400° C. and 1500° C., respectively.

When stabilized with 4 and 6 mole percent yttria and toughened with calcium tungstate, toughness values of zirconia, again, exhibited a significant increase over yttria-stabilized zirconia. The highest toughness values were found when zirconia was stabilized with 2 mole percent yttria and toughened with 2.5 mole percent calcium tungstate.

Calcium molybdate exhibited similar toughening trends when 0.5-10 mole percent was added to zirconia stabilized with 3 mole percent yttria. Toughness values were about 5.2 MPa√m at 1300° C., and ranged from 5.4-6.2 MPa√m at 1400° C., and from 5.5-7.3 MPa√m at 1500° C. Comparable values of toughness for zirconia stabilized solely with 3 mole percent yttria were 4.8, 5.1, and 5.7 MPa√m at 1300° C., 1400° C., and 1500° C., respectively. The highest toughness values were found when zirconia was stabilized with 3 mole percent yttria and toughened with 0.5 and 5.0 mole percent calcium molybdate.

When doped with tungsten oxide, yttria-stabilized zirconia showed improvements in toughness of 11%, 20%, and 44% at 1300° C., 1400° C., and 1500° C., respectively, while additions of molybdenum oxide improved toughness 29% and 56% at 1400° C. and 1500° C., respectively. The hardness showed a slight decrease when tungsten oxide or molybdenum oxide was added.

When 1.25 mole percent calcium tungstate and 1.25 mole percent calcium molybdate were added to yttria-stabilized zirconia, it exhibited 30% and 40% increases in toughness at 1400° C. and 1500° C. respectively. Previous data on calcium tungstate and calcium molybdate hint that calcium tungstate rich combinations may yield higher toughness values.

Whereas the above description has been drawn to shaped bodies produced by such means as sintering, it will be recognized that the term body includes such variants as beads, coatings, fibers, honeycombs, and sheets fabricated utilizing a wide variety of methods known to the art, including but not limited to, hot pressing, arc melting, plasma spraying, skull melting, and zone melting. For example, the hardness and toughness exhibited by the inventive materials strongly suggest their utility as abrasion resistant and thermal barrier coatings.

The advantage of the disclosed invention lies in the markedly improved toughness of ceramic matrix materials stabilized with $SnO_2$, $CeO_2$, $Sc_2O_3$, $Y_2O_3$, $TiO_2$, and/or $RE_2O_3$ and toughened with vanadates, calcium tungstate and/or calcium molybdate and/or magnesium tungstate and/or magnesium molybdate, and tungsten oxide and/or molybdenum oxide. Calcium tungstate/molybdate and magnesium tungstate/molybdate toughening agents make possible the production of ceramic alloys with good toughness, yet without great expense.

I claim:

1. A transformation toughened ceramic alloy consisting essentially, expressed in terms of mole percent on the oxide basis, of
   (A) 79–99.5% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;
   (B) 0.25–15% of at least one stabilizer oxide in the indicated proportions selected from the group consisting of 0–7% $Sc_2O_3$, 0–7% $Y_2O_3$, 0–15% $CeO_2$, 0–15% $TiO_2$, and 0–7% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; and
   (C) 0.25–6% of at least one toughening agent in the indicated proportion selected from the group consisting of 0–6% $MgWO_4$, 0–6% $MgMoO_4$, 0–6% $CaWO_4$, 0–6% $CaMoO_4$, 0–4% $WO_3$, and 0–4% $MoO_3$.

2. A ceramic alloy according to claim 1 wherein up to one-half of the $TiO_2$ is replaced with $SnO_2$.

3. A ceramic alloy exhibiting resistance to attack by vanadium compounds at elevated temperatures consisting essentially, expressed in terms of mole percent on the oxide basis, of
   (A) 65–99.5% of at least one member selected from the group consisting of $HfO_2$, partially stabilized $ZrO_2$, partially stabilized $HfO_2$, $ZrO_2$-$HfO_2$ solid solution, and partially stabilized $ZrO_2$-$HfO_2$ solid solution; and
   (B) 0.5–35% $MVO_4$ wherein M consists of at least one cation selected from the group consisting of $Mg^{+2}$, $Ca^{+2}$, $Sc^{+3}$, $Y^{+3}$, $Sn^{+4}$, $Ti^{+4}$, $La^{+3}$, $Ce^{+3}$, $Ce^{+4}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$.

4. A ceramic alloy according to claim 3 also exhibiting significant transformation toughening wherein said $MVO_4$ is present in an amount between 0.5–10%.

5. A ceramic alloy according to claim 4 wherein said $MVO_4$ is present in an amount between 0.5–5%.

6. A ceramic alloy according to claim 3 wherein up to one-half of the vanadium content is replaced with niobium and/or tantalum.

7. A transformation toughened ceramic alloy consisting essentially, expressed in terms of mole percent on the oxide basis, of
   (A) 40–94.75% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;
   (B) 5–45% $SnO_2$; and
   (C) 0.25–15% of at least one oxide in the indicated proportion selected from the group consisting of 0–10% $Sc_2O_3$, 0–10% $Y_2O_3$, 0–15% $CeO_2$, and 0–10% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$.

8. A ceramic alloy according to claim 8 wherein up to one-half of the $SnO_2$ is replaced with $TiO_2$.

9. A ceramic body consisting essentially of 5–95% by volume of a hard refractory ceramic material and 5–95% by volume of a ceramic alloy consisting essentially, expressed in terms of mole percent on the oxide basis, of
   (A) 79–99.5% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;
   (B) 0.25–15% of at least one stabilizer oxide in the indicated proportions selected from the group consisting of 0–7% $Sc_2O_3$, 0–7% $Y_2O_3$, 0–15% $CeO_2$, 0–15% $TiO_2$, and 0–7% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; and
   (C) 0.25–6% of at least one toughening agent in the indicated proportion selected from the group consisting of 0–6% $MgWO_4$, 0–6% $MgMoO_4$, 0–6% $CaWO_4$, 0–6% $CaMoO_4$, 0–4% $WO_3$, and 0–4% $MoO_3$.

10. A ceramic body according to claim 9 wherein said hard refractory ceramic material consists of at least one member of the group consisting of $\alpha$-$Al_2O_3$, $\beta$-$Al_2O_3$, $\beta''$-$Al_2O_3$, $Al_2O_3$-$Cr_2O_3$ solid solutions, mullite, nasicon, sialon, SiC, $Si_3N_4$, spinel, $TiB_2$, TiC, $Al_2O_3$-mullite/$Cr_2O_3$-mullite solid solutions, zircon, and ZrC.

11. A ceramic body according to claim 10 wherein up to one-half of the $TiO_2$ in said alloy is replaced with $SnO_2$.

12. A ceramic body consisting essentially of greater than 70% and up to 95% by volume of hard refractory ceramic material selected from the group consisting of $\alpha$-$Al_2O_3$, $\beta$-$Al_2O_3$, $\beta''$-$Al_2O_3$, and $Al_2O_3$-$Cr_2O_3$ solid solutions, and the remainder a ceramic alloy consisting essentially, expressed in terms of mole percent on the oxide basis, of
   (A) 94–99.75% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution; and
   (B) 0.25–6% of at least one toughening agent in the indicated proportion selected from the group consisting of 0–6% $MgWO_4$, 0–6% $MgMoO_4$, 0–6% $CaWO_4$, 0–6% $CaMoO_4$, 0–4% $WO_3$, and 0–4% $MoO_3$.

13. A ceramic body consisting essentially of up to 80% by volume refractory ceramic fibers and/or whiskers and the remainder of a ceramic alloy consisting essentially, expressed in terms of mole percent on the oxide basis, of
 (A) 79–99.5% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;
 (B) 0.25–15% of at least one stabilizer oxide in the indicated proportions selected from the group consisting of 0–7% $Sc_2O_3$, 0–7% $Y_2O_3$, 0–15% $CeO_2$, 0–15% $TiO_2$, and 0–7% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; and
 (C) 0.25–6% of at least one toughening agent in the indicated proportion selected from the group consisting of 0–6% $MgWO_4$, 0–6% $MgMoO_4$, 0–6% $CaWO_4$, 0–6% $CaMoO_4$, 0–4% $WO_3$, and 0–4% $MoO_3$.

14. A ceramic body according to claim 13 wherein said refractory ceramic fibers and/or whiskers consist of at least one member of the group consisting of $Al_2O_3$, AlN, BN, $B_4C$, mullite, SiC, $Si_3N_4$, silicon oxycarbide, sialon spinel, zircon, and $ZrO_2$.

15. A ceramic body according to claim 13 wherein up to one-half of the $TiO_2$ in said alloy is replaced with $SnO_2$.

16. A three-component, composite ceramic body consisting of a hard refractory ceramic material, refractory ceramic fibers and/or whiskers, and a ceramic alloy consisting essentially, expressed in terms of mole percent on the oxide basis, of
 (A) 79–99.5% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;
 (B) 0.25–15% of at least one stabilizer oxide in the indicated proportions selected from the group consisting of 0–7% $Sc_2O_3$, 0–7% $Y_2O_3$, 0–15% $CeO_2$, 0–15% $TiO_2$, and 0–7% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; and
 (C) 0.25–6% of at least one toughening agent in the indicated proportion selected from the group consisting of 0–6% $MgWO_4$, 0–6% $MgMoO_4$, 0–6% $CaWO_4$, 0–6% $CaMoO_4$, 0–4% $WO_3$, and 0–4% $MoO_3$;
said refractory ceramic fibers and/or whiskers being present in an amount not exceeding 80% by volume, said ceramic alloy being present in an amount of at least 5% by volume, and said refractory ceramic material comprising the remainder of said body.

17. A ceramic body according to claim 16 wherein said hard refractory ceramic material consists of at least one member of the group consisting of $\alpha$-$Al_2O_3$, $\beta$-$Al_2O_3$, $\beta''$-$Al_2O_3$, $Al_2O_3$-$Cr_2O_3$ solid solutions, mullite, nasicon, sialon, SiC, $Si_3N_4$, spinel, $TiB_2$, TiC, $Al_2O_3$-mullite/$Cr_2O_3$-mullite solid solutions, zircon, and ZrC, and said refractory ceramic fibers and/or whiskers consist of at least one member of the group consisting of $Al_2O_3$, AlN, BN, $B_4C$, mullite, SiC, $Si_3N_4$, silicon oxycarbide, sialon, spinel, zircon, and $ZrO_2$.

18. A ceramic body according to claim 16 wherein up to one-half of the $TiO_2$ in said alloy is replaced with $SnO_2$.

19. A ceramic body consisting essentially of 5–95% by volume of a hard refractory ceramic material and 5–95% by volume of a ceramic alloy consisting essentially, expressed in terms of mole percent on the oxide basis, of
 (A) 65–99.5% of at least one member selected from the group consisting of $HfO_2$, partially stabilized $ZrO_2$, partially stabilized $HfO_2$, $ZrO_2$-$HfO_2$ solid solution, and partially stabilized $ZrO_2$-$HfO_2$ solid solution; and
 (B) 0.5–35% $MVO_4$, wherein M consists of at least one cation selected from the group consisting of $Mg^{+2}$, $Ca^{+2}$, $Sc^{+3}$, $Y^{+3}$, $Sn^{+4}$, $Ti^{+4}$, $La^{+3}$, $Ce^{+3}$, $Ce^{+4}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$.

20. A ceramic body according to claim 19 wherein said $MVO_4$ of said alloy is present in an amount between 0.5–10%.

21. A ceramic body according to claim 19 wherein up to one-half of the vanadium content in said alloy is replaced with niobium and/or tantalum.

22. A ceramic body according to claim 19 wherein said hard refractory ceramic material consists of at least one member of the group consisting of $\alpha$-$Al_2O_3$, $\beta$-$Al_2O_3$, $\beta''$-$Al_2O_3$, $Al_2O_3$-$Cr_2O_3$ solid solutions, mullite, nasicon, sialon, SiC, $Si_3N_4$, spinel, $TiB_2$, TiC, $Al_2O_3$-mullite/$Cr_2O_3$-mullite solid solutions, zircon, and ZrC.

23. A ceramic body consisting essentially of up to 80% by volume of refractory ceramic fibers and/or whiskers and the remainder of a ceramic alloy consisting essentially, expressed in terms of mole percent on the oxide basis, of
 (A) 65–99.5% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution; and
 (B) 0.5–35% $MVO_4$, wherein M consists of at least one cation selected from the group consisting of $Mg^{+2}$, $Ca^{+2}$, $Sc^{+3}$, $Y^{+3}$, $Sn^{+4}$, $Ti^{+4}$, and a rare earth metal cation selected from the group consisting of $La^{+3}$, $Ce^{+3}$, $Ce^{+4}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$.

24. A ceramic body according to claim 23 wherein said refractory fibers and/or whiskers consist of at least one member of the group consisting of $Al_2O_3$, AlN, BN, $B_4C$, mullite, SiC, $Si_3N_4$, silicon oxycarbide, sialon, spinel, zircon, and $ZrO_2$.

25. A ceramic body according to claim 24 wherein up to one-half of the vanadium content in said alloy is replaced with niobium and/or tantalum.

26. A three-component, composite ceramic body consisting of a hard refractory ceramic material, refractory ceramic fibers and/or whiskers, and a ceramic alloy consisting essentially, expressed in terms of mole percent on the oxide basis of
 (A) 65–99.5% of at least one member selected from the group consisting of $HfO_2$, partially stabilized $ZrO_2$, partially stabilized $HfO_2$, $ZrO_2$-$HfO_2$ solid solution, and partially stabilized $ZrO_2$-$HfO_2$ solid solution; and (B) 0.5-35% $MVO_4$, wherein M consists of at least one cation selected from the group consisting of $Mg^{+2}$, $Ca^{+2}$, $Sc^{+3}$, $Y^{+3}$, $Sn^{+4}$, $Ti^{+4}$, $La^{+3}$, $Ce^{+3}$, $Ce^{+4}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$;

said refractory ceramic fibers and/or whiskers being present in an amount not exceeding 80% by volume, said ceramic alloy being present in an amount of at least 5% by volume, and said refractory ceramic material comprising the remainder of said body.

27. A ceramic body according to claim 26 wherein said hard refractory ceramic material consists of at least one member of the group consisting of $\alpha$-$Al_2O_3$, $\beta$-$Al_2O_3$, $\beta''$-$Al_2O_3$, $Al_2O_3$-$Cr_2O_3$ solid solutions, mullite, nasicon, sialon, SiC, $Si_3N_4$, spinel, $TiB_2$, TiC, $Al_2O_3$-mullite/$Cr_2O_3$-mullite solid solutions, zircon, and ZrC, and said refractory ceramic fibers and/or whiskers consist of at least one member of the group consisting of $Al_2O_3$, AlN, BN, $B_4C$, mullite, SiC, $Si_3N_4$, silicon oxycarbide, sialon, spinel, zircon, and $ZrO_2$.

28. A ceramic body according to claim 26 wherein up to one-half of the vanadium content in said alloy is replaced with niobium and/or tantalum.

29. A ceramic body consisting essentially of 5-95% by volume of a hard refractory ceramic material and 5-95% by volume of a ceramic alloy consisting essentially, expressed in terms of mole percent on the oxide basis, of (A) 40-94.75% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;

(B) 5-45% $SnO_2$; and (C) 0.25-15% of at least one oxide in the indicated proportion selected from the group consisting of 0-10% $So_2O_3$, 0-10% $Y_2O_3$, 0-15% $CeO_2$, and 0-10% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$.

30. A ceramic body according to claim 29 wherein up to one-half of the $SnO_2$ in said alloy is replaced with $TiO_2$.

31. A ceramic body according to claim 29 wherein said hard refractory ceramic material consists of at least one member of the group consisting of $\alpha$-$Al_2O_3$, $\beta$-$Al_2O_3$, $\beta''$-$Al_2O_3$. $Al_2O_3$-$Cr_2O_3$ solid solutions, mullite, nasicon, sialon, SiC, $Si_3N_4$, spinel, $TiB_2$, TiC, $Al_2O_3$-mullite/$Cr_2O_3$-mullite solid solutions, zircon, and ZrC.

32. A ceramic body consisting essentially of up to 80% by volume of refractory ceramic fibers and/or whiskers and the remainder of a ceramic alloy consisting essentially, expressed in terms of mole percent on the oxide basis, of (A) 40-94.75% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;

(B) 5-45% $SnO_2$; and (C) 0.25-15% of at least one oxide in the indicated proportion selected from the group consisting of 0-10% $Sc_2O_3$, 0-10% $Y_2O_3$, 0-15% $CeO_2$, and 0-10% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$.

33. A ceramic body according to claim 32 wherein said refractory fibers and/or whiskers consist of at least one member of the group consisting of $Al_2O_3$, AlN, BN, $B_4C$, mullite, SiC, $Si_3N_4$, silicon oxycarbide, sialon, spinel, zircon, and $ZrO_2$.

34. A ceramic body according to claim 32 wherein up to one-half of the $SnO_2$ in said alloy is replaced with $TiO_2$.

35. A three-component, composite ceramic body consisting of a hard refractory ceramic material, refractory ceramic fibers and/or whiskers, and a ceramic alloy consisting essentially, expressed in terms of mole percent on the oxide basis, of (A) 40-94.75% of at least one member selected from the group consisting of $ZrO_2$, $HfO_2$, partially stabilized $ZrO_2$, partially stabilized $HfO_2$, $ZrO_2$-$HfO_2$ solid solution, and partially stabilized $ZrO_2$-$HfO_2$ solid solution;

(B) 5-45% $SnO_2$; and (C) 0.25-15% of at least one oxide in the indicated proportion selected from the group consisting of 0-10% $Sc_2O_3$, 0-10% $Y_2O_3$, 0-15% $CeO_2$, and 0-10% $RE_2O_3$, wherein $RE_2O_3$ is a rare earth metal oxide selected from the group consisting of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; said refractory ceramic fibers and/or whiskers being present in an amount not exceeding 80% by volume, said ceramic alloy being present in an amount of at least 5% by volume, and said refractory ceramic material comprising the remainder of said body.

36. A ceramic body according to claim 35 wherein said hard refractory ceramic material consists of at least one member of the group consisting of $\alpha$-$Al_2O_3$, $\beta$-$Al_2O_3$, $\beta''$-$Al_2O_3$, $Al_2O_3$-$Cr_2O_3$ solid solutions, mullite, nasicon, sialon, SiC, $Si_3N_4$, spinel, $TiB_2$, TiC, $Al_2O_3$-mullite/$Cr_2O_3$-mullite solid solutions, zircon, and ZrC, and said refractory ceramic fibers and/or whiskers consist of at least one member of the group consisting of $Al_2O_3$, AlN, BN, $B_4C$, mullite, SiC, $Si_3N_4$, silicon oxycarbide, sialon, spinel, zircon, and $ZrO_2$.

37. A ceramic body according to claim 35 wherein up to one-half of the $SnO_2$ in said alloy is replaced with $TiO_2$.

* * * * *